C. B. BILLINGHURST.
DEVICE FOR CONTROLLING SHOCK.
APPLICATION FILED SEPT. 10, 1914. RENEWED AUG. 16, 1916.
1,198,885.
Patented Sept. 19, 1916.
3 SHEETS—SHEET 2.
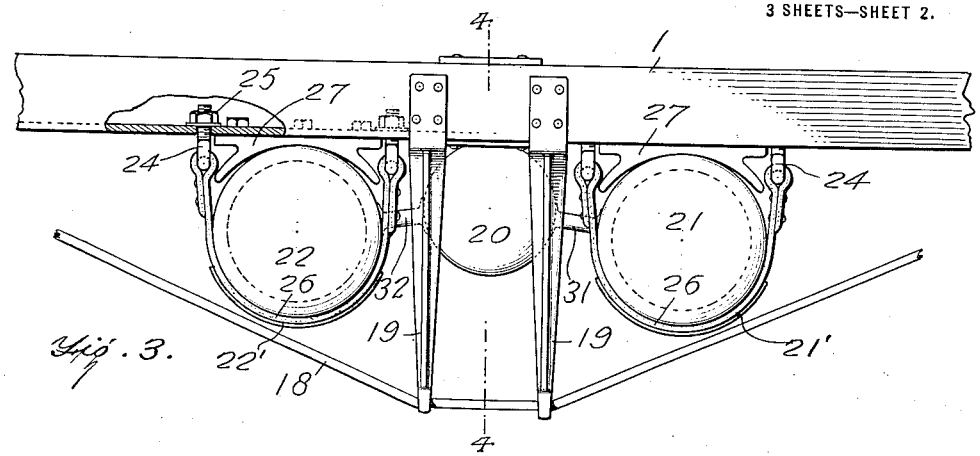
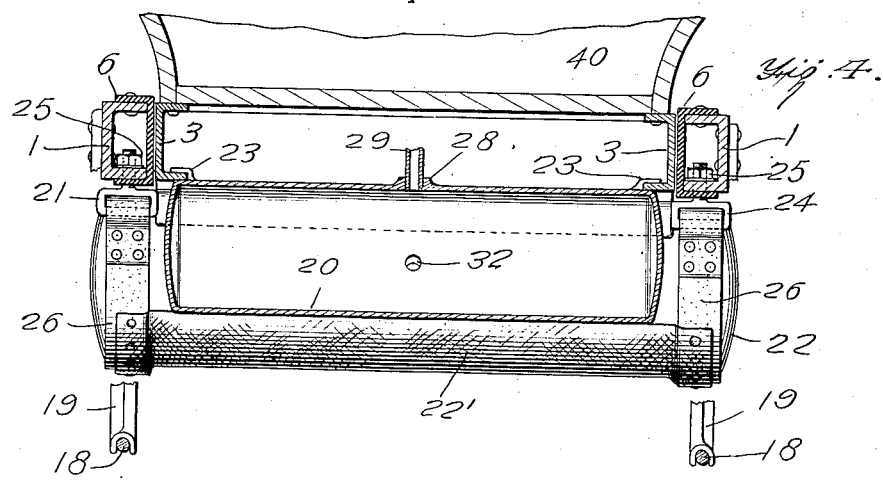
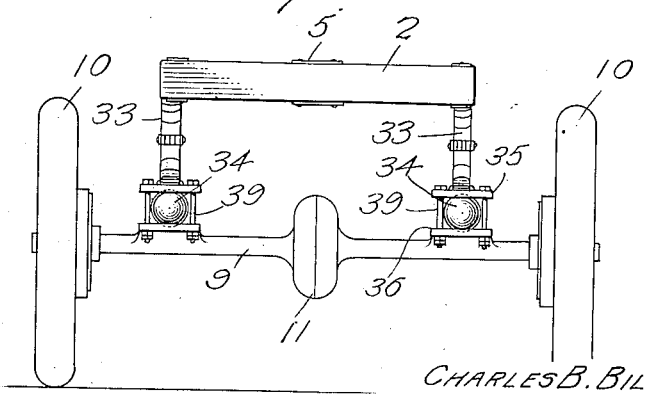
WITNESSES
INVENTOR
CHARLES B. BILLINGHURST,
BY
ATTORNEYS

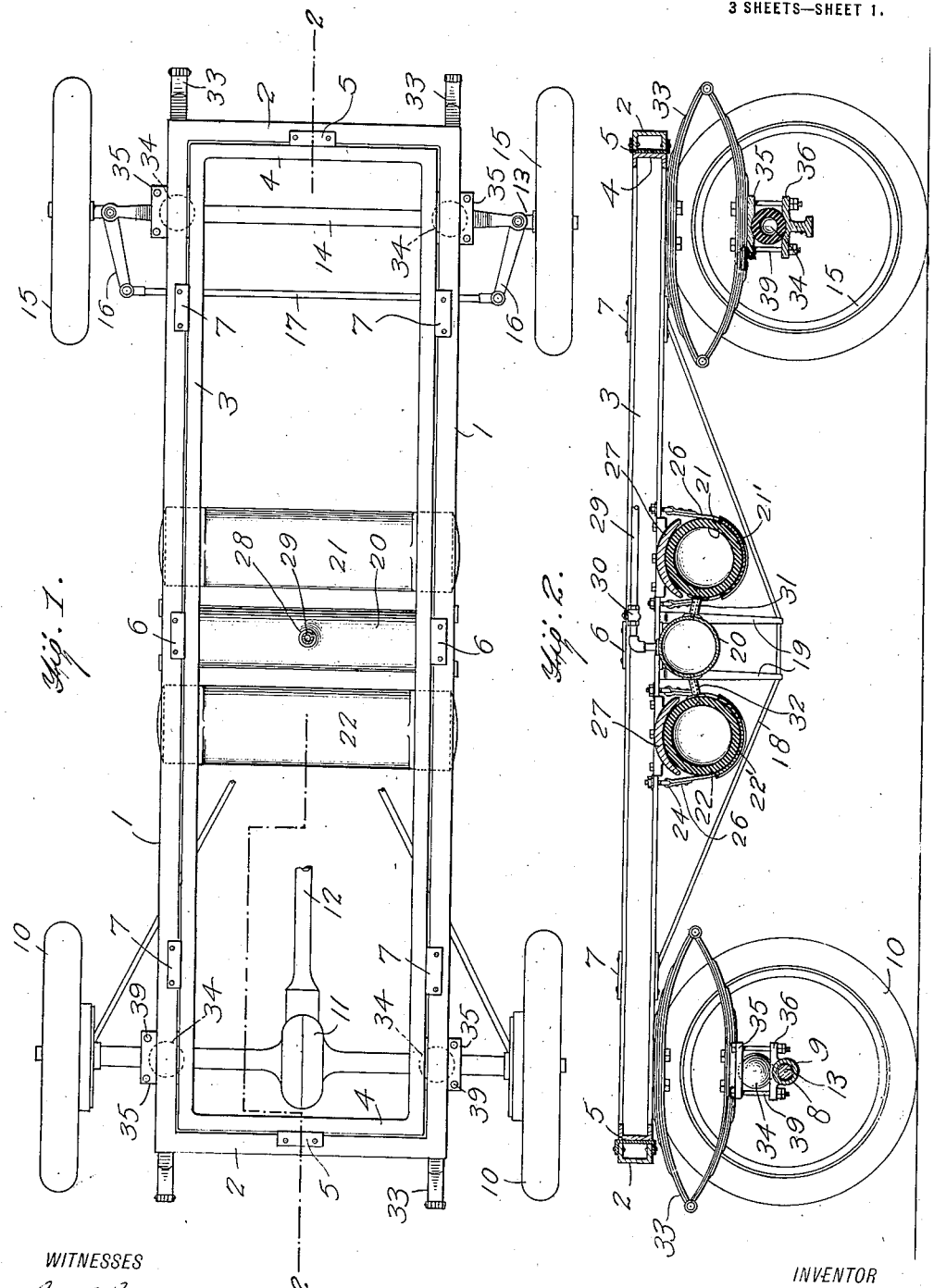

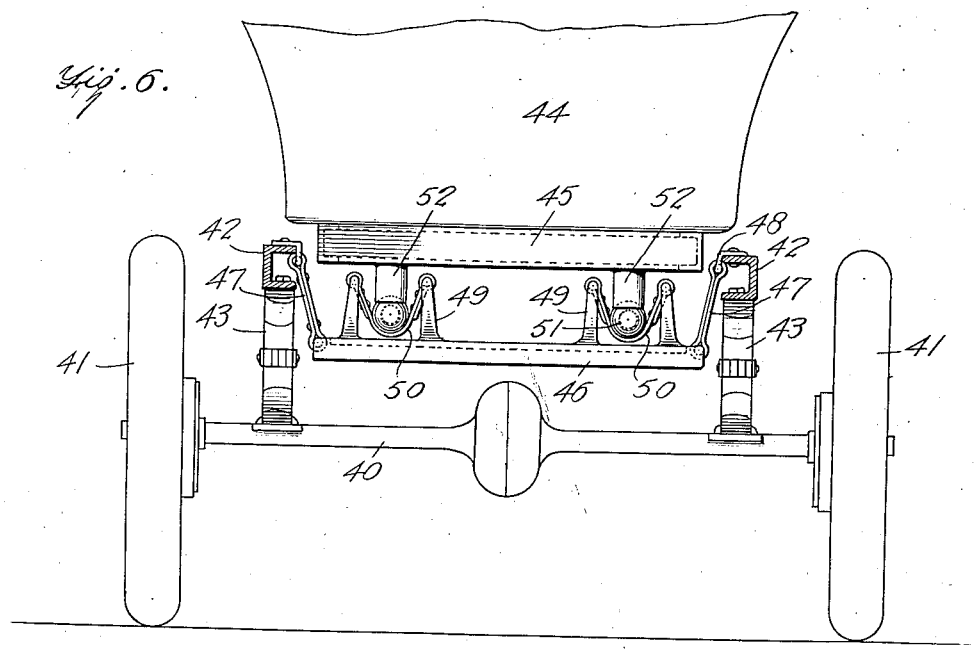
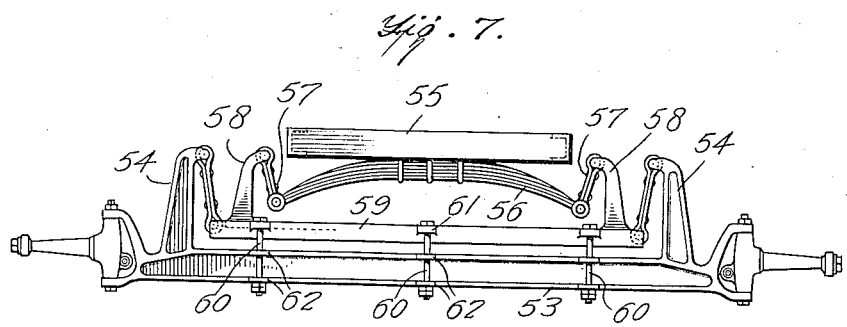
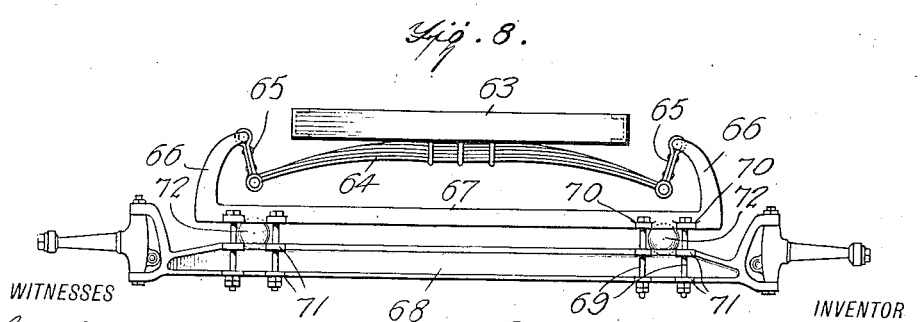

UNITED STATES PATENT OFFICE.

CHARLES B. BILLINGHURST, OF PIERRE, SOUTH DAKOTA.

DEVICE FOR CONTROLLING SHOCK.

1,198,885. Specification of Letters Patent. Patented Sept. 19, 1916.

Application filed September 10, 1914, Serial No. 861,045. Renewed August 16, 1916. Serial No. 115,331.

*To all whom it may concern:*

Be it known that I, CHARLES B. BILLINGHURST, a citizen of the United States, and a resident of Pierre, in the county of Hughes and State of South Dakota, have invented a new and useful Improvement in Devices for Controlling Shock, of which the following is a specification.

My invention is an improvement in devices for controlling shock, and has for its object to provide mechanism for use in motor vehicles of every character for absorbing the shock and jar resulting from the movement of the vehicle over the road, wherein pneumatic cushions are arranged between the body and the frame of the vehicle in such manner that they will absorb and cushion the movement of the body and frame with respect to each other.

In the drawings:—Figure 1 is a top plan view of the frame of an automobile provided with the improvement, Fig. 2 is a section on the line 2—2 of Fig. 1, Fig. 3 is an enlarged side view of a portion of the frame with parts in section, Fig. 4 is a section on the line 4—4 of Fig. 3, Fig. 5 is a rear view, Fig. 6 is a rear view of a modified construction partly in section, and Figs. 7 and 8 are front views of other modifications.

In the embodiment of the invention shown in Figs. 1 to 5, the vehicle is provided with a substantially rectangular frame, consisting of side and end members 1 and 2, respectively, the frame being an integral structure of channel material, and arranged with the channel inward. An inner frame is arranged within the outer frame, the inner frame being also rectangular and consisting of side members 3 and end members 4. The inner frame is also of channel material, and is arranged with the channel inward.

At the center of each of the end members 2, a substantially U-shaped bracket 5 is arranged, the body of the bracket being arranged transversely of the channel and with the arms embracing the flanges of the end members and above and below the said flanges. The brackets are riveted to the outer frame, and similar brackets 6 and 7 are connected with the side members 1 of the outer frame. The brackets 6 are arranged at the center of the sides and the brackets 7 near the ends.

The rear axle 8 is arranged within the usual housing 9, and wheels 10 are arranged on the spindles of the axle. The usual differential is provided, arranged in the housing 11, and the drive shaft, not shown, is arranged in the housing 12. The front axle 14 is of the usual construction, connected to the frame in the usual manner, and wheels 15 are journaled on the spindles 13, which are pivoted to the ends of the axle in the usual manner. The steering arms 16 of the spindle are connected by a steering rod 17, and the usual form of steering mechanism is connected with the rod. The side members of the outer frame are braced by suspension braces 18, the said braces being connected with the frames near the ends thereof and being engaged by struts 19 at their centers.

A tank or reservoir 20 is supported transversely of the frame at approximately the center thereof and other tanks or reservoirs 21 and 22 are arranged in front and in rear of the said tank or reservoir. The tank or reservoir 20 has outwardly extending lugs 23, which engage above the lower flange of the side members of the inner frame and the tank is supported in this manner just below the inner frame. The outer tanks or reservoirs 21 and 22 are supported from the outer frame. The outer tanks or reservoirs 21 and 22 are suspended from the side members of the outer frame.

Eye bolts 24 are passed through the lower flanges of the outer frame, and are engaged by nuts 25, above the flange. Each of the eye bolts has an elongated eye, and a pair of bolts is arranged at each end of each of the said tanks or reservoirs and at opposite sides of the same.

Straps 26 are engaged at their ends with the loops or eyes of the eye bolts, and the tanks or reservoirs are suspended in the straps. A species of saddle 27 is arranged above each end of each reservoir, the said saddle being secured to the adjacent side member 3 of the inner frame, and each saddle engages the adjacent end of the adjacent tank.

The tank or reservoir 20 has a nipple 28 in its upper side, and the nipple is engaged by a supply pipe 29. A valve 30 is arranged in the supply pipe adjacent to the tank or reservoir for controlling the flow of air through the same, and pipes 31 and 32 lead from the central tank or reservoir 20 to the lateral tanks 21 and 22.

The usual springs 33 are arranged between the outer frame and the front and rear axles, the springs being connected to the frame in the usual manner, and a hollow rubber ball 34 is arranged between each spring and the adjacent axle. Each of the balls 34 is arranged between a plate 35 and an extension 36 from the adjacent axle.

Each plate 35 and each extension 36 is recessed on the face adjacent to the ball for receiving the same, and bolts 39 are passed through the ends of the plate and the ends of the extension for connecting the plates to the extension. The bolts are slidable and it will be evident that the resiliency of the balls may be thus utilized to cushion the body 40 of the vehicle against shock.

The tanks or reservoirs 21 and 22 are of flexible and elastic material, as for instance, rubber and canvas, such as is used in the manufacture of pneumatic tire shoes or casings, and the balls 34 are of similar material. The tank 20 may be supplied with air under pressure in any suitable manner, and the connections 31 and 32 are always open so that the air may flow freely from the central to the lateral tanks.

The slings or straps 26 are of leather, and the tanks or reservoirs 21 and 22 are as before stated, of rubber. These three tanks are filled with air, and the valve 30 which is the check valve prevents the escape of the air. The central tank is connected to the inner frame and the lateral tanks are connected to the outer frame.

The connections 31 and 32 are flexible, so that the inner tank may be moved with respect to the outer tank without affecting the said connection. Each of the cylinders or tanks 21 and 22 is supported by the outer frame, and the inner frame which carries the body 40 of the vehicle is supported by the cylinders 21 and 22.

In operation, a shock or jar imparted to the wheels by ruts and inequalities is partially absorbed by the pneumatic tires if used. A portion of what is not absorbed will be taken up by the balls or spheres 34, and the remainder must be sufficient to counterbalance the resilient connection between the inner frame and the outer frame to cause any shock or jar to the body of the vehicle.

It will be obvious that many different arrangements might be used, other than that shown in Figs. 1 and 5. As for instance, in Fig. 6, the housing 40 of the rear axle carries the wheels 41, and is cushioned, against the outer frame 42 of the vehicle, by means of elliptical springs 43. The body 44 of the vehicle is supported by an inner frame 45, and this frame together with the body of the vehicle is suspended from the outer frame.

Plates or bars 46 are arranged transversely of the body at each end thereof and below the same, and each plate or bar is suspended from the outer frame by means of hangers 47. Each hanger 47 engages the plate or bar 46 at one end, and a clip 48 secured to the outer frame at the other end. The plate or bar 46 is provided with pairs of brackets 49, and the members of each pair of brackets supports a flexible hanger 50. Each hanger engages one member of a pair of brackets at one end and the other member of the pair at the other end, and the body of the hanger is adjacent to the upper face of the bar or plate 46.

Hollow spheres 51 similar to the spheres 34, just described, are supported by the hangers 50, and each sphere is engaged by a cylindrical extension 52 on the frame. Each of the extensions is recessed at its lower end to fit the ball and the extensions engage the balls as shown in the said figure.

In Fig. 7, the front axle 53 has bracket arms 54 at each end, and the frame 55 of the vehicle has a semi-elliptical leaf spring 56, arranged transversely thereof, and supported at its ends by hangers 57. The hangers 57 engage the end of the spring at one end and at the other they engage uprights or standards 58 on a plate or bar 59, arranged transversely of the axle above the same and in spaced relation. The plate 59 is movable vertically with respect to the axle and is guided in its movement by means of rods 60, which pass through registering lugs 61 on the plate 59 and 62 on the axle.

The lugs 62 are arranged in pairs, and the rods 60 are also arranged in pairs, one member of each pair being on one side of the axle and the other on the other side. The sphere 34 may be arranged between the plate or bar 59 and the axle in the manner shown in Fig. 8. In this construction the frame 63 of the vehicle has a semi-elliptical leaf spring 64, arranged transversely thereof, and the ends of the spring are supported by hangers 65 from bracket arms 66, extending upward from each end of a plate or bar 67. This plate or bar corresponds to the plate or bar 59 and is arranged above the axle 68 in spaced relation.

Guide rods 69 are passed through registering lugs 70 on the plate or bar 67 and 71 on the axle, the lugs 71 being arranged in pairs. The spheres or balls 72 are arranged between the plate or bar 67 and the upper edge of the axle, and each ball is arranged between four of the guide rods, that is, a pair in front of the axle and a pair in rear of the axle.

The reservoirs 21—22 are provided with additional supports 21′ and 22′ in the form of cradles of canvas or the like. These cradles are connected to the slings 26 at their ends and cover nearly one-half of the underside of each reservoir.

The present invention is especially intended for cars not provided with pneumatic tires as substituted for the tires. It is obvious however, that the devices may be used with equal advantage in vehicles having pneumatic tires. While the tank 20 is shown as attached to the inner frame, it may be attached to either frame or to the struts 19. The essential feature of this reservoir is that it carries no load.

The tank is preferably, though not essentially, of metal. The preferable manner of using the improvement is with vehicles having so-called spring wheels or a modified construction of pneumatic tire, reinforced against puncture and blow outs. As a rule, neither metallic spring tires nor reinforced pneumatic tires have the resiliency of the pneumatic tire and the cushioning effect of the said tires. This is especially true of the forms shown in Figs. 5, 6, 7 and 8.

I claim:—

1. In a motor vehicle, the combination with the body, the frame, and the wheels for supporting the same, and the springs arranged between the wheels and the frame, of an auxiliary frame to which the body is secured and independent of the main frame and movable vertically with respect thereto, auxiliary cushioning mechanism arranged between the auxiliary frame and the main frame and supporting the auxiliary frame, said auxiliary cushioning mechanism comprising hollow flexible resilient containers filled with air under pressure, said containers being of approximately cylindrical form and arranged transversely of the auxiliary frame at the center thereof, a metallic supply tank arranged between the containers, and having a check controlled inlet, said tank being supported by the auxiliary frame, slings depending from the main frame at the ends of the containers, said containers being supported by the slings, saddles on the auxiliary frame and resting on the ends of the containers, and flexible connections between the supply tank and the containers.

2. In a motor vehicle, the combination with the body, the frame, and the wheels for supporting the same, and the springs arranged between the wheels and the frame, of an auxiliary frame to which the body is secured and independent of the main frame and movable vertically with respect thereto, auxiliary cushioning mechanism arranged between the auxiliary frame and the main frame and supporting the auxiliary frame, said auxiliary cushioning mechanism comprising hollow flexible resilient containers filled with air under pressure, said containers being of approximately cylindrical form and arranged transversely of the auxiliary frame at the center thereof, a metallic supply tank arranged between the containers, and having a check controlled inlet, said tank being supported by the auxiliary frame, said containers being suspended from the main frame and the auxiliary frame resting on the said containers, and a connection between the supply tank and the containers.

3. In a motor vehicle, the combination with the body, the frame, and the wheels for supporting the same, and the springs arranged between the wheels and the frame, of an auxiliary frame to which the body is secured and independent of the main frame and movable vertically with respect thereto, auxiliary cushioning mechanism arranged between the auxiliary frame and the main frame and supporting the auxiliary frame, said auxiliary cushioning mechanism comprising hollow flexible resilient containers filled with air under pressure, said containers being of approximately cylindrical form and arranged transversely of the auxiliary frame at the center thereof, slings on the main frame for engaging the ends of the containers to support the same, saddles on the auxiliary frame and engaging the containers, and means for supplying air under pressure to the containers.

4. In a motor vehicle, a main frame for connection with the wheels and an auxiliary frame for connection with the body and independent of the main frame, auxiliary cushioning mechanism arranged between the said frames, said mechanism comprising hollow, flexible and resilient containers suspended from the main frame transversely thereof, the auxiliary frame resting on the said containers, and means for supplying air and pressure to the containers.

CHARLES B. BILLINGHURST.

Witness:
W. M. KELLY.